United States Patent [19]
Jacobsen et al.

[11] Patent Number: 5,580,249
[45] Date of Patent: Dec. 3, 1996

[54] APPARATUS FOR SIMULATING MOBILITY OF A HUMAN

[75] Inventors: Stephen C. Jacobsen, Salt Lake City; David F. Knutti, Taylorsville; Robert J. Douglass, Sandy, all of Utah

[73] Assignee: Sarcos Group, Salt Lake City, Utah

[21] Appl. No.: 195,486

[22] Filed: Feb. 14, 1994

[51] Int. Cl.$^6$ .................................................. F41A 33/00
[52] U.S. Cl. ............................................ 434/11; 434/255
[58] Field of Search .......................... 434/11, 247, 255, 434/258, 61; 482/51, 52, 53, 75, 66, 69, 57

[56] References Cited

U.S. PATENT DOCUMENTS

| | | | |
|---|---|---|---|
| 430,808 | 6/1890 | Naish | 482/51 X |
| 3,750,479 | 8/1973 | Gause et al. | 482/57 X |
| 4,315,241 | 2/1982 | Spooner . | |
| 4,527,982 | 7/1985 | Salzman et al. | 434/258 |
| 5,016,869 | 5/1991 | Dick et al. | 482/75 |
| 5,135,447 | 8/1992 | Robards et al. . | |
| 5,137,450 | 8/1992 | Thomas . | |
| 5,213,503 | 5/1993 | Marshall et al. . | |
| 5,213,555 | 5/1993 | Hood et al. | 482/57 |
| 5,403,252 | 4/1995 | Leon et al. . | |

FOREIGN PATENT DOCUMENTS

| | | |
|---|---|---|
| 0255142 | 7/1987 | European Pat. Off. . |
| 0551962A3 | 1/1988 | European Pat. Off. . |
| 3218086A1 | 5/1982 | Germany . |
| 542521 | 1/1977 | U.S.S.R. ................................. 482/66 |

OTHER PUBLICATIONS

Nawtilus ® Aerobic Stairclimber AS.2000 (Brochure), Received in Group 330 Jan. 13, 1994.

*Primary Examiner*—Gene Mancene
*Assistant Examiner*—Jeffrey A. Smith
*Attorney, Agent, or Firm*—Thorpe North & Western

[57] ABSTRACT

An individual person mobility simulator includes a base for placement on a support surface, a steering post extending upwardly from the base to terminate in an upper end, a seat mounted on the upper end of the steering post on which a human operator may sit, a torque/position sensor disposed between the seat and the steering post to sense changes in seat position caused by the operator, and foot stirrups into which the operator may place his feet, the foot stirrups being movably mounted on the steering post. A power source is provided to supply a resistive force to movement of the foot stirrups in response to and dependent upon resistance signals. A control unit supplies resistance signals to the power source to determine the amount of resistance to be applied to movement of the foot stirrups. The amount of resistance is geared to simulate the steepness of terrain over which the operator is moving, with greater resistance being applied when the terrain is uphill and less resistance being applied when the terrain is level or downhill, for example.

38 Claims, 8 Drawing Sheets

APPARATUS FOR SIMULATING MOBILITY OF A HUMAN

BACKGROUND OF THE INVENTION

This invention relates to a system for simulating the mobility of a human operator such as a combat soldier.

It has long been the desire of military organizations to provide training for personnel which would be effective in simulating combat situations while, at the same time, maintaining the safety of the personnel. Of course, one approach to doing this is simply to place the personnel in an outdoor training location to carry out planned maneuvers, and possibly conduct simulated war games. The drawback of this approach is that it is more costly to prepare the desired variety of terrain necessary to provide the training personnel with more realistic combat conditions, and to transport the personnel to the training areas and equip all of the personnel. Also, there are safety hazards in placing personnel in the field even though the combat conditions are only simulated. Finally, it is more difficult to monitor the performance of the individual personnel in an outdoor training location and evaluate their capabilities, than would be the case under more controlled conditions.

Although a number of devices have been proposed for providing combatant simulation in a laboratory, such as hand-driven haptic devices for measuring coordination and dexterity, power treadmills for measuring stamina, etc., these devices are severely limited in that they do not allow free, natural movement of the combatant's hands and feet, as would be the case in a real life combat situation. It would be desirable to provide a laboratory-type simulator system where a more realistic combat environment could be simulated for testing a soldier's stamina, skill, reactionability, etc. under more controlled and safe conditions.

SUMMARY OF THE INVENTION

It is an object of the invention to provide a method and apparatus for efficiently and realistically simulating the mobility of an individual human operator such as a soldier.

It is also an object of the invention to provide such a method and apparatus which is safe for the human operator.

It is a further object of the invention to provide such a method and apparatus in which the operator's performance can be carefully and closely monitored.

The above and other objects of the invention are realized in a specific illustrative embodiment of apparatus for simulating mobility of a human operator. The apparatus includes a base, a pair of foot holders movably mounted on the base for receiving and holding the feet of the operator, where the foot holders move in response to movement of the operator's feet. A resistive force generator is coupled to the foot holders for applying a resistive force against movement of the foot holders, in response to condition signals. The apparatus also includes a visual display responsive to display signals for developing virtual scenes viewable by the operator. The visual display could be a screen at least partially surrounding the operator on which the scenes are projected, or wearable head gear for placement on the operator's head to cover the operator's eyes and allow viewing of the scenes developed in the head gear. The apparatus also includes a control unit for supplying display signals to the visual display to generate the scenes to be displayed, and for supplying condition signals to the resistive force generator to vary the resistive forces applied to the foot holders, dependent upon the scenes being displayed. For example, if the scenes are of uphill terrain, then greater resistive force would be applied to the foot holders to make movement of the foot holders more difficult thereby simulating the greater difficulty in walking uphill.

In accordance with one aspect of the invention, the apparatus further includes a movement sensor for sensing movement of the foot holders and for producing movement indication signals. The control unit responds to the movement indication signals by supplying display signals to the visual display to cause a change of the scenes being displayed. For example, if movement of the foot holders is in a manner simulating the operator walking forward, then the control unit would detect this and change the scene displayed to simulate the operator moving forward in the scene.

In accordance with another aspect of the invention, the apparatus also includes a head rotation sensor disposed on the operator for sensing rotation of the operator's head and for producing head rotation signals. This would be for use in conjunction with a headgear visual display. The control unit responds to the head rotation signals by supplying display signals to the headgear visual display to change the scenes displayed. For example, the control unit might cause the scene to move in a direction opposite the direction of the rotation of the operator's head so that the scene appears static or stationary to the operator as he sweeps his eyes over scenes while turning his head.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Figure 1:
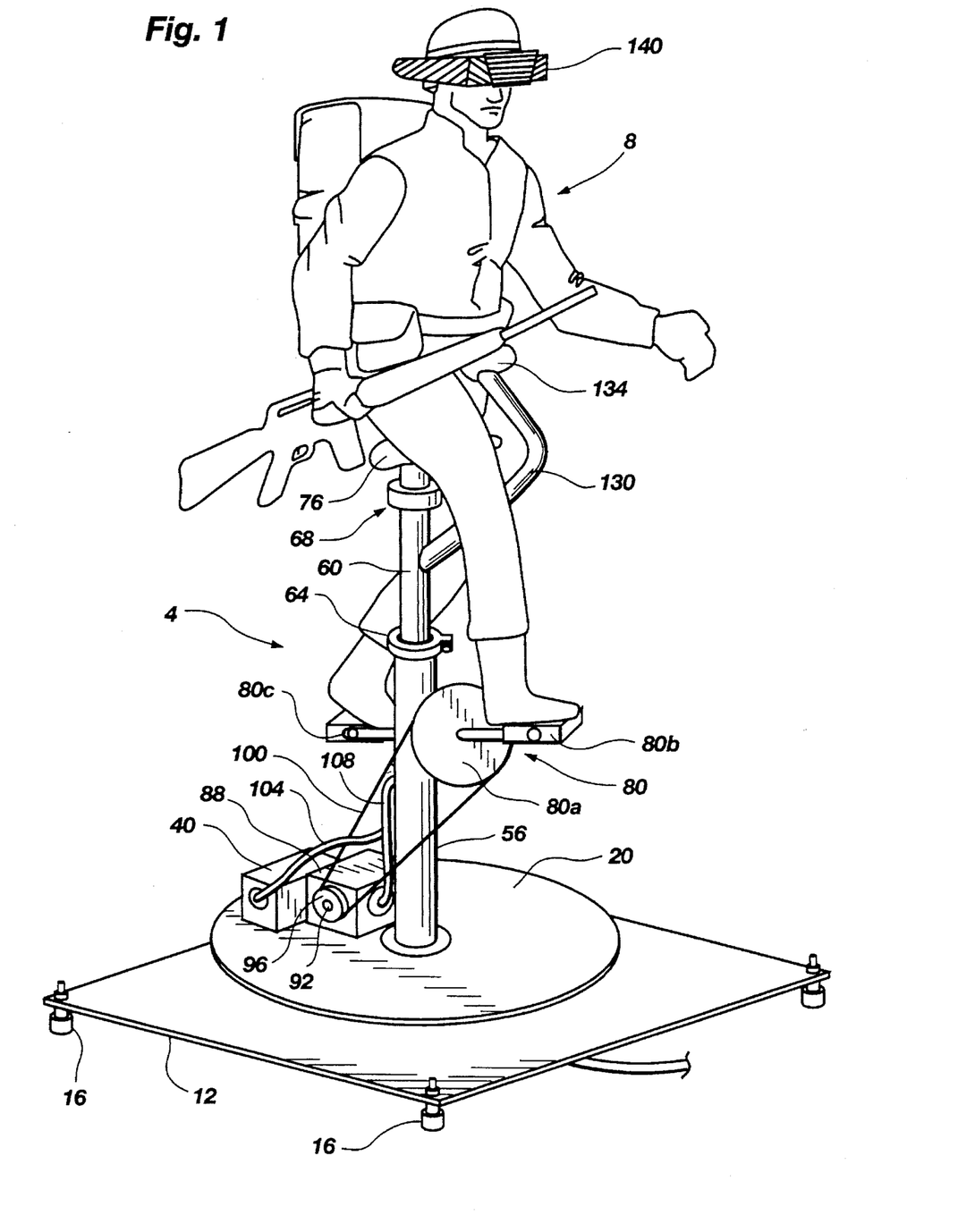
FIG. 1 is a perspective view of a specific illustrative embodiment of an individual person mobility simulator made in accordance with the principles of the present invention.

Referring to FIG. 1, there is shown an individual person mobility simulator 4 on which a person or operator 8 would be positioned to operate the simulator. The simulator 4 includes a base 12 for placement on a support surface. Projecting downwardly from the base 12 are four feet 16 which may be adjusted as to height to allow for leveling of the base.

Rotatably mounted on the base 12 is the rest of the simulator assembly including a platform 20. This mounting may be done in any conventional fashion, including that best seen in FIG. 2 which includes posts 24 upstanding from the base 12, on the top of which, in a generally horizontal configuration, is mounted a fixed sprocket 28. Projecting from the base 12, up through the sprocket 28 is an annular support 32 on which the platform 20 is rotatably mounted. A ring bearing 36 interfaces the platform 20 with the annular support 32 to allow smooth rotation of the platform.

Figure 2:
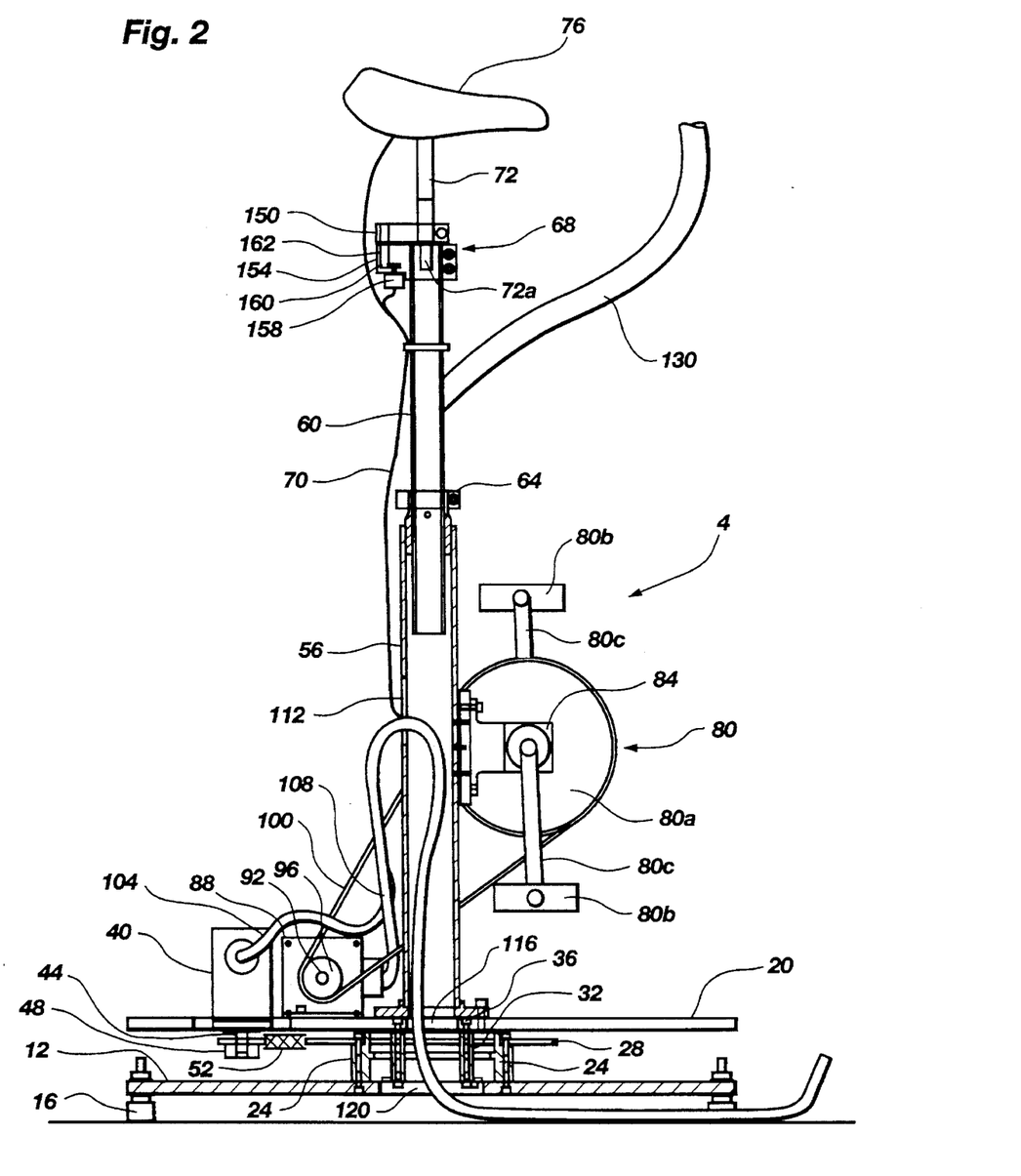
FIG. 2 is a side, partially cross-sectional view of the individual person mobility simulator of FIG. 1.

Referring now to both FIGS. 1 and 2, a rotate motor 40 is mounted on the platform 20 to allow a drive shaft 44 and sprocket 48 mounted thereon to extend to a location below the platform 20 (FIG. 2). A drive chain or belt 52 is wound about the drive sprocket 48 and fixed sprocket 28 so that when the motor 40 is operated, the drive sprocket 48 rotates against the belt 52, which is not allowed to move because it is wrapped around the fixed sprocket 28. This causes the platform 20 to rotate. The direction of rotation of the platform, of course, depends upon the direction of rotation or operation of the motor 40.

Figure 4:
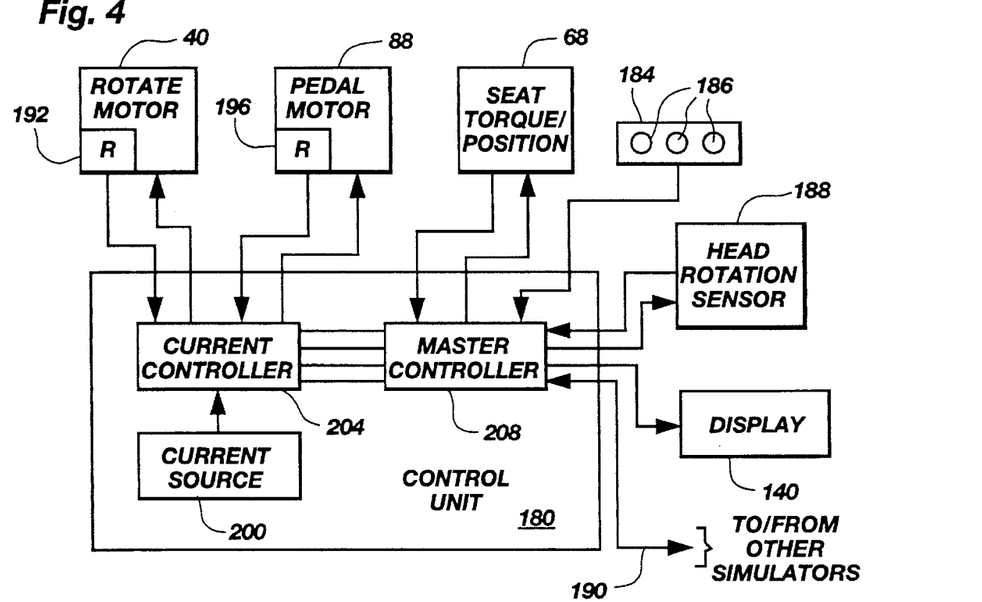
FIG. 4 is a schematic view of one embodiment of a control system for controlling operation of the individual person mobility simulator.

Upstanding from the platform 20 in general alignment with the axis of rotation of the platform 20 is a tubular support post 56. Slidably disposed in the support post 56 is an adjustable post 60 which may be adjusted longitudinally within the support post 56 and then clamped in place at a desired position by a conventional squeeze clamp 64. Mounted at the upper end of the adjustable post 60 is a torque/position detection device or sensor 68 coupled by conductors 70 to control equipment (FIG. 4). Upwardly extending from the torque/position sensor 68 is a seat post 72 and a seat 76. The torque/position sensor 68 will be discussed in detail momentarily.

Mounted on the front side of the support post 56 is a bicycle drive sprocket and pedals 80. Included are a sprocket 80a, pedals 80b, and pedal-sprocket connecting arms 80c. The sprocket and pedals 80 are mounted on a bracket 84, attached to the front side of the support post 56, to rotate in a generally vertical plane, in a conventional manner. Mounted on the platform 20 is a pedal motor 88 which includes a drive shaft 92 and sprocket 96 about the latter of which is positioned a drive chain or belt 100, which is also positioned about the drive sprocket 80a. Connection of the pedal motor 88 to the sprocket and pedals 80 allows for controlling the resistance to pedaling encountered by the operator 8. That is, delivery of a back EMF (back torque) opposite to the attempted direction of rotation of the sprocket and pedals 80 will present a resistance to pedaling, felt by the operator. The greater the back EMF, the greater resistance would be felt. This will be further explained momentarily.

Cables 104 and 108 for carrying current to the motors 40 and 88 respectively extend through an opening 112 in the rear side of the support post 56, down through the center of the support post, opening 116 in the platform 20 and opening 120 in the base 12, and out from under the base 12 to control equipment (FIG. 4). Connecting the control equipment by a cable through the center of the support post 56 to the motors 40 and 88 simplifies maintenance of the cable or conductor connections between the control equipment and the motors, and prevents twisting of the cable about the support post 56 when the platform 20 is rotated.

Extending forwardly and upwardly from the adjustable post 60 is a support brace 130. Mounted on the upper end of the support brace 130 is a torso support 134 against which the operator 8 may lean to stabilize himself or herself on the simulator (FIG. 1). As will be discussed in more detail later, certain icon controls are located in the torso support 134 and coupled by cable (not shown) to the control equipment.

Positioned on the head of the operator 8 is a visual display headgear 140, on which virtual displays are developed under control of a control unit (FIG. 4) and in response to certain actions taken by the operator. Specifically, various scenes of terrain which might be encountered by the operator 8 in a simulated combat situation are displayed on the visual display headgear 140, simulating for example uphill terrain, level terrain, downhill terrain and similar variations. The visual display headgear 140 might illustratively comprise a VIM Head Mounted Display which is available from Kaiser Aerospace and Electronics, Inc.

Figures 3, 7:
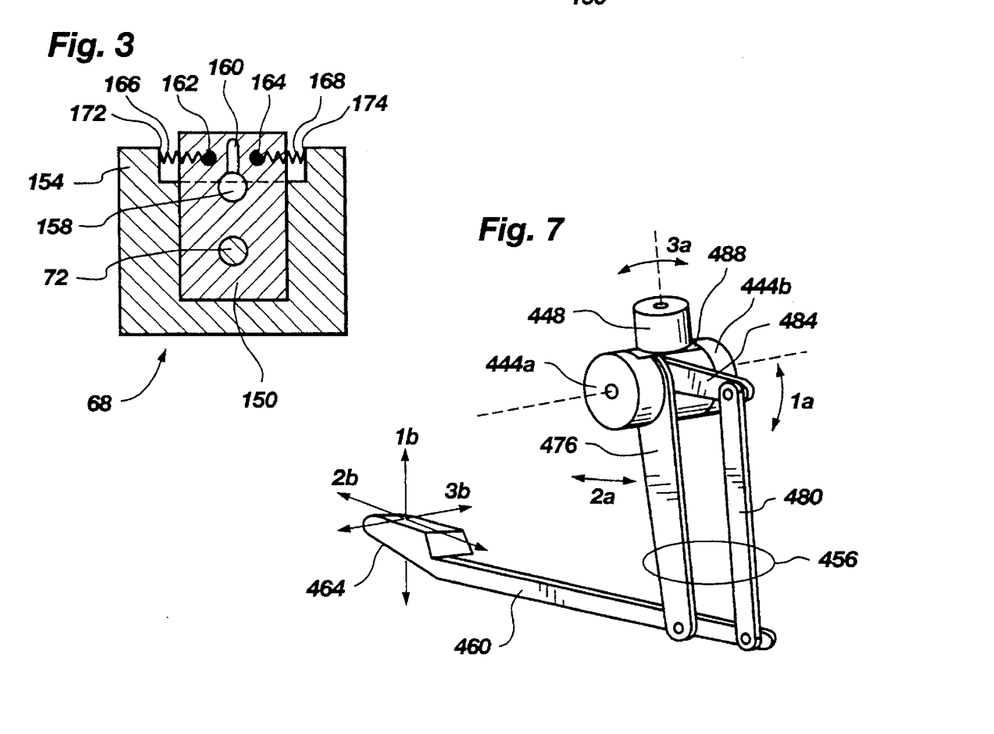
FIG. 3 is a top, plan view of the torque/position detection mechanism of the individual person mobility simulator of FIGS. 1 and 2.
FIG. 7 is a rear perspective view of one of the articulated arms of the simulator of FIG. 6.

Referring now to FIGS. 2 and 3, an illustrative embodiment of the torque/position sensor 68 of FIGS. 1 and 2 is shown. The torque/position sensor 68 includes an upper plate or bracket 150 mounted on the seat post 72 (FIG. 2). The bracket 150 rotatably rests on a torque/position sensor housing 154 which is mounted at the top of the adjustable post 60 with an opening to allow the lower end 72a of the seat post to extend into the upper end of the adjustable post. A potentiometer 158 is mounted underneath the torque/position sensor housing 154 and includes a pivot arm 160 which extends from the potentiometer 158 to a location between two posts 162 and 164 which extend downwardly from the bracket 150. Two springs 166 and 168 are disposed between the posts 162 and 164 respectively and mounting surfaces 172 and 174 respectively of the housing 154, to urge the bracket 150 towards a center position.

When the operator 8 twists or rotates on the seat 76, the seat is caused to rotate (in a horizontal plane) which, in turn, causes rotation of the bracket 150. Rotation of the bracket 150 causes one of the posts 162 or 164 (depending upon the direction of rotation) to contact the pivot arm 160 which changes the electrical resistance of potentiometer 158, and the current allowed to flow therethrough. The springs 166 and 168, of course, urge against rotation of the bracket 150 but, nevertheless, the change in position by the operator 8 to the seat 76 will be reflected in the degree of rotation of the bracket 150 and thus the degree to which the pivot arm 160 of the potentiometer 158 is moved. If the pivot arm 160 is moved in one direction, then the potentiometer 158 allows, for example, more current to flow therethrough, and when the pivot arm is moved in the opposite direction, the potentiometer allows less current to flow therethrough. In this manner, the operator controls the operation of the rotate motor 40 by changing the position of the seat 76. Flow of current to the potentiometer 158 is under control of a control unit of FIG. 4. A straight torque sensor, rather than position sensor, could also be used in this application, in which case, there would be no displacement or rotation of the seat 76—rather just a force or torque applied by the operator to the seat.

FIG. 4 shows a schematic of a control system for monitoring or sensing the operation of the individual person mobility simulator of FIGS. 1 and 2 (and others to be discussed momentarily) and for producing virtual simulation of the environment or battlefield for display on the visual display headgear 140 (FIG. 1). The control unit of FIG. 4 also controls the resistance to pedaling encountered by the operator of the individual person mobility simulator, dependent upon the nature of the terrain being traversed by the operator in the simulated environment or battlefield.

The control system of FIG. 4 incudes a control unit 180 which interfaces with the rotate motor 40, pedal motor 88, seat torque/position sensor 68, icon controller 184 located in the torso support 134, and the visual display headgear 140. A head rotation sensor 188 is also shown connected to the control unit 180. Also, the control unit 180 is coupled to resolvers 192 and 196 which are part of the rotate motor 40 and pedal motor 88 respectively. The resolvers are conventional devices for producing signals indicating the speed of rotation and position of a motor drive shaft.

The control unit 180 includes a current source 200 which provides electrical current for both operating the rotate motor 40 and providing a back EMF to the pedal motor 88. The current source 200 is coupled through a current controller 204 to the rotate motor 40 and pedal motor 88. The current controller allows application of current to the motors under control of a master controller 208. Signals from the resolvers 192 and 196 are also passed by the current controller 204 to the master controller 208. The master controller 208 might illustratively be a microprocessor, with memory, such as an M68040 processor, manufactured by Motorola, Inc.

In operation, the control unit 180 initiates a simulation sequence, under program control, by placing the operator at a predetermined location (along with other desired objects and circumstances) in the virtual scene (battlefield), developed from a simulation data base provided to the master controller 208. The scene is then presented to the display 140 for viewing by the operator (from a location at which the operator has been placed in the scene). The operator may then begin to move by simulating walking or running via pedaling of the drive sprocket and pedals 80 (FIG. 1). The resistance encountered in pedaling is determined by the scene being displayed to the operator, i.e., whether it is level, uphill, downhill, or some intermediate condition. For example, if the scene being displayed is of a hill and the operator is moving toward and up the hill, then the master controller 208 would signal the current controller 204 to allow a greater back EMF to be supplied to the pedal motor 88 creating a greater resistance to pedaling.

If the operator desired to change direction of his movement in the scene, the operator would apply a twisting torque to the seat 76 (FIG. 1) in the direction which the operator desired to move, and the resultant change of position of the seat would be detected by the seat torque/position sensor 68 which would signal the master controller 208 accordingly. The master controller 208 would update its data base to indicate the changing direction of movement of the operator, and the scene being displayed to the operator would likewise change to display the terrain in the direction now being faced by the operator. Also, the master controller 208 would control the current controller 204 to supply power to the rotate motor 40 to cause rotation of the platform 20 (FIG. 1). In this manner, the operator experiences a virtual environment in which the operator's movement is tracked to update the scenes displayed and resistances provided to the operator, to indicate the ground he is traversing, its location, slope, and trafficability. The speed of movement of the operator will determine the speed with which he traverses the ground within the virtual display and provide continual updates of the data base.

In addition to the seat torque/position sensor 68 is a head rotation sensor 188 which would be worn by the operator for example on the back of his neck and which would detect rotations of the head to provide an indication of the direction in which the operator was looking. The master controller 208 would receive signals from the head rotation sensor 188 indicating the direction in which the operator was looking, and then update and change the scene being displayed to the operator to show the new direction in which the operator was looking. Head rotation sensors are available from a number of sources, one such sensor being sold under the name Fastrak, manufactured by Polhemus, Inc.

The icon control panel 184 is used in conjunction with the generation of a so-called icon representing the operator in the virtual display. Such icon would be a figure or object representing the operator in the virtual scene to indicate the visibility of the operator in the scene, dependent upon whether the operator is in an upright position, crouching position, or prone position. The operator may operate one of the three buttons 186 of the icon control 184 to designate the depicted posture of the icon to be displayed—large for the upright position, medium for the crouching position and small for the crawling or prone position, and the master controller 208 would change the posture of the icon in the scene.

Although the icon of an operator would not be displayed to that operator (since he would not see himself in the scene), if other operators were to be included in the battlefield scene, information as to the position and size of each operator (icon) in the scene would be conveyed to the operators so that scenes developed by each control unit would include icons of all other operators participating in the simulation including their positions and sizes. In this manner, a more realistic battlefield simulation, with other players being shown, can be produced.

Input from posture control switches 186 are read by the master controller 208. The master controller increases pedal resistance for prone positions to simulate the increased energy load required by crawling. The master controller also sends signals to the display generators 140 of other operators, if any, so that they will see the operator in the correct posture. If multiple operators are participating in a common simulation, then information about each operator's location, posture, orientation, and speed is communicated by the master controller 208 to all other master controllers in the simulation via a common network communication line 190.

Figure 5:
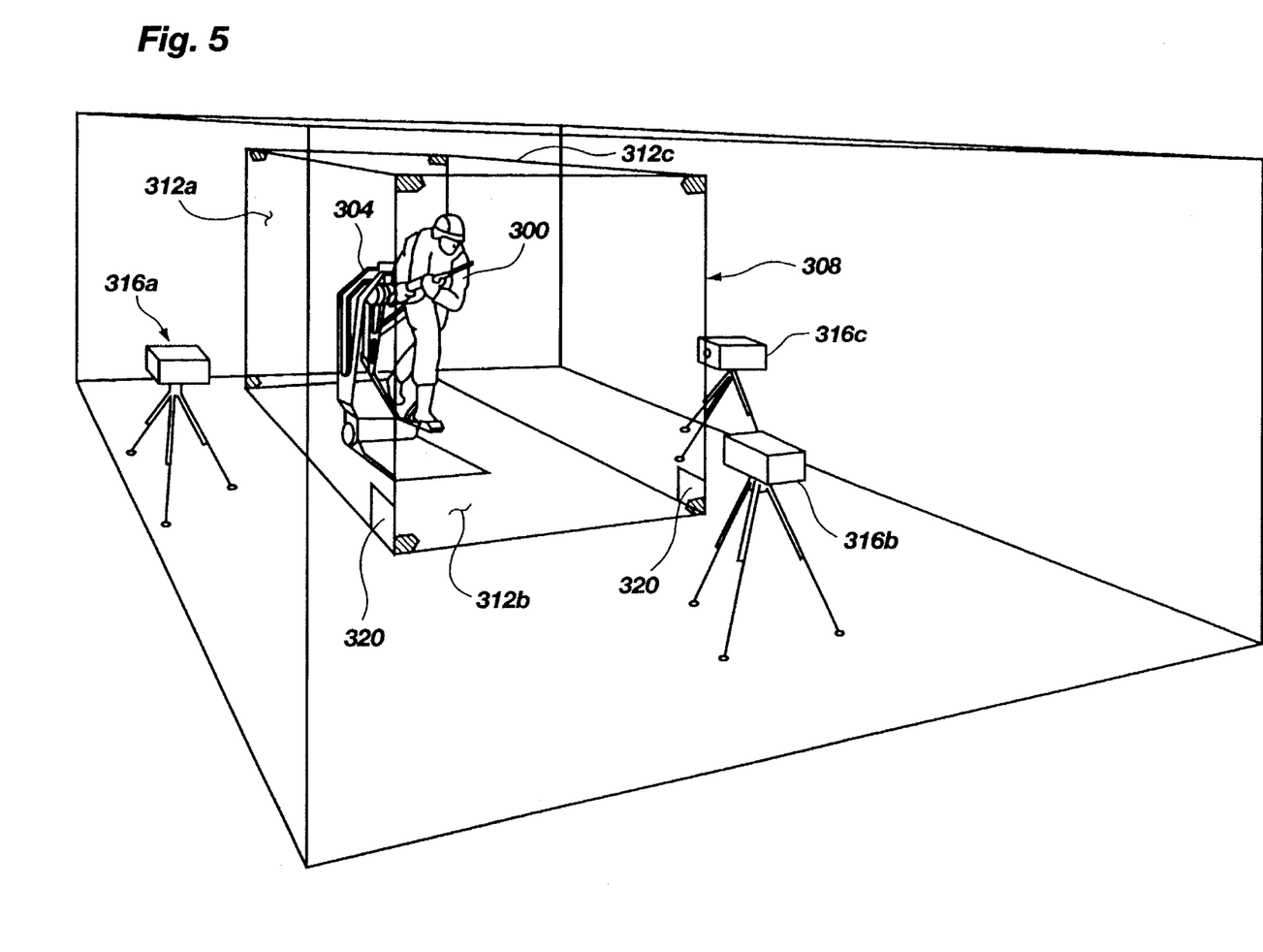
FIG. 5 is a perspective view of an individual person mobility simulator positioned in a display enclosure or walk in synthetic environment.

FIG. 5 shows an alternative embodiment of a system for displaying synthetic or simulated battlefield terrain. In this system, an operator 300 and individual person mobility simulator 304 (of a type to be described in conjunction with FIG. 6) are positioned within an audio visual booth or walk in synthetic environment (WISE) 308 constructed of a wrap-around translucent screen or screens 312a, 312b and 312c. The screens 312 are rear-projection screens on which are presented the computer-generated terrain images by three projectors 316a, 316b and 316c. Sound speakers 320 are disposed within the booth 308 for broadcasting simulated battlefield sounds. The projectors 316 and speakers 320 all operate under control of the master controller 208 (FIG. 4). In addition to terrain images, simulated air and land military vehicles could be included in the projected scenes to even more realistically simulate battlefield conditions. The projectors 316 might illustratively be a Marque 8000 ip, manufactured by Electrohome, Inc.

An advantage of the system of FIG. 5 is that the operator 300 need not wear the headgear display 140 (FIG. 1) and could thus wear standard military gear such as laser protective lenses, night vision goggles, a gas mask or other head-mounted equipment. The operator 300 can also more readily dismount from the individual person mobility simulator 304 without disturbing the scene being viewed (as would be the case if the headgear display were being worn).

Figure 6:
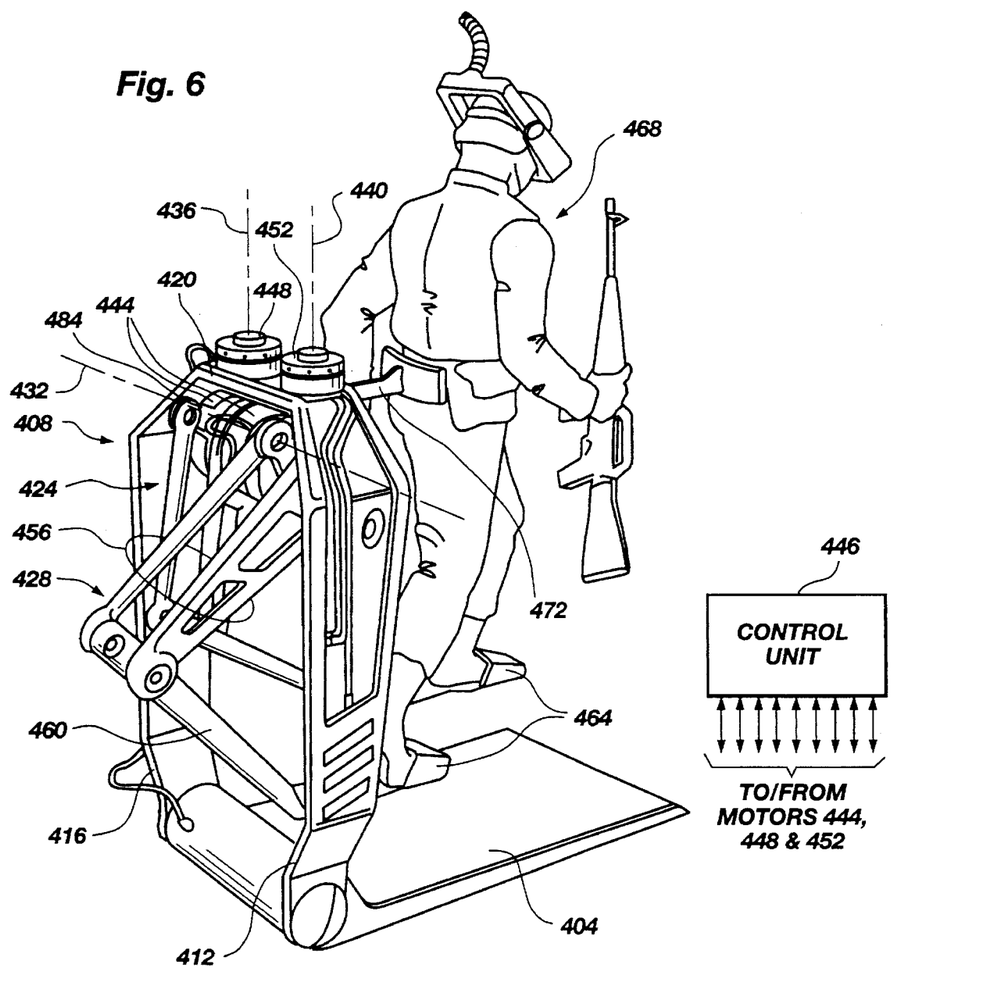
FIG. 6 is a rear, perspective view of an alternative embodiment of an individual person mobility simulator made in accordance with the present invention.

FIG. 6 is a perspective rear view of an alternative embodiment of an individual person mobility simulator. This embodiment includes a base 404 for placement on a support surface, and a rear frame 408 having a pair of side posts 412 and 416 extending upwardly from the sides and rear of the base 404, and a top brace 420 joining the tops of the two side posts to form a rigid frame. A pair of articulated arms 424 and 428 are movably mounted under the brace 420 and between the side posts 412 and 416, to pivot about a horizontal axis 432 (in a manner to be described momentarily), and to rotate about vertical axes 436 and 440 respectively (also in the manner to be describe momentarily). Pivot motors 444 are coupled to the articulated arm 424 to provide resistance to pivoting of the arm under control of a control unit 446 in a manner similar to that described for the embodiment of FIGS. 1 and 2 for the pedal motor. Two pivot motors are also coupled to the articulated arm 428 to provide resistance to pivoting of that arm. Rotate motors 448 and 452, mounted on the top brace 420, are coupled to articulated arms 424 and 428 respectively to provide resistance to rotation of the arms, again under control of the control unit 446.

Each of the articulated arms 424 and 428 include a parallelogram upper section 456 (for arm 428) and a lower arm 460 which extends downwardly and forwardly from the lower end of the parallelogram section 456. On the free ends of the lower arms are foot holders 464, similar to water ski foot receptacles, into which an operator 468 may insert his feet as shown.

An operator support brace 472 extends forwardly from the top brace 420 to contact the back of the operator 468 and provide support while operating the individual person mobility simulator of FIG. 6.

With the simulator of FIG. 6, the arrangement of the articulated arms 424 and 428 provide for a more natural and realistic simulation of walking, running or climbing by the operator in the foot holders 464. Movement of the articulated arms can best be understood by reference to FIG. 7 which shows a perspective view of one articulated arm. This arm includes the parallelogram portion 456 having parallel legs 476 (the upper end of which is coupled to the drive shaft of a pivot motor 444a) and 480 (the upper end of which is pivotally coupled to one end of a linkage arm 484). The other end of the linkage arm 484 is coupled to the drive shaft of pivot motor 444b. The lower ends of legs 476 and 480 are pivotally joined to the lower arm 460 at spaced apart locations as shown. A brace 488 is mounted on the tops of pivot motors 444a and 444b and then the brace 488 is coupled to the drive shaft of a rotate motor 448. The rotate motor 448 would be mounted on a top brace of a frame similar to the top brace 420, with the drive shaft of the rotate motor extending through the top brace for joining to the brace 488.

As indicated earlier, the pivot motors 444a and 444b and the rotate motor 448, under control of the control unit 446 (FIG. 6), provide resistance to movement of the articulated arm in three degrees of freedom of movement illustrated by the arrows labeled 1a, 2a and 3a for the foot holder 464. In particular, rotate motor 448 (FIG. 7) provides resistance to rotation of the entire articulated arm assembly in the direction indicated by the arrow "3a," which allows the foot holder 464 to move laterally as indicated by the arrow "3b" extending from the foot holder. The pivot motor 444a provides resistance to movement of the leg 476 of the parallelogram portion 456 of the articulated arm, in the direction indicated by the arrow labeled "2a" which, in turn, determines movement of the foot holder 464 generally forwardly or backwardly as indicated by the arrow "2b" extending from the foot holder. Finally, pivot motor 444b provides resistance to movement of the linkage arm 484 up and down as indicated by the arrow labeled "1a," and thus resistance to movement of the foot holder 464 up and down as indicated by arrow "1b" extending from the foot holder. Thus, resistance to movement of an operator's foot in three degrees of freedom of movement is provided by the articulated arm shown in FIG. 7 to provide a more realistic simulation of walking, running, etc. by the operator.

In addition to providing resistance to movement of the articulated arms 424 and 428, the pivot motors 444a and 444b and rotate motor 448 include resolvers for measuring the movement of the articulated arm in each of the three degrees of movement allowed. This information is transmitted to the control unit 446 (FIG. 6) which processes the information to determine the distance and direction moved by the operator in the virtual environment so that the scenes displayed can be updated to represent the movement of the operator in the scene, as earlier discussed.

Figure 8:
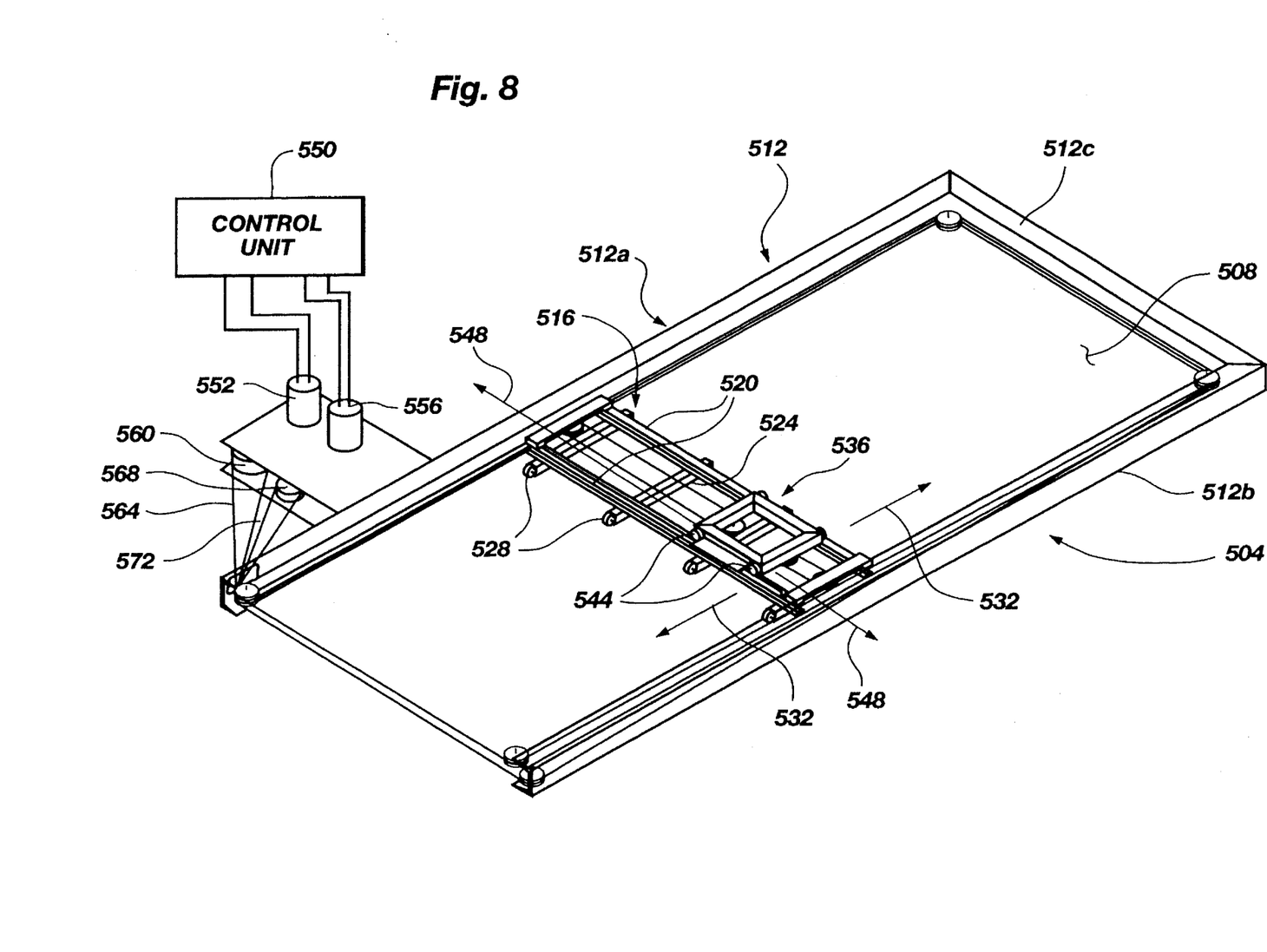
FIG. 8 is a perspective view of a translation platform made in accordance with the present invention.

FIG. 8 shows a perspective view of a translation or acceleration platform 504 on which would be mounted an individual person mobility simulator such as those in FIGS. 1 and 2 or FIG. 6. The platform 504 provides a more realistic feeling of walking and running since it allows the operator to actually move, relative to the ground, rather than simply walking or running in place, with feet slippage, as would be the case without the platform. Thus, the operator would actually move forward when walking but then would be returned to the center region of the platform after such movement. As will be clear from the description which follows, the translation platform allows for two degrees of freedom of movement, forward and backward and sideways.

The translation platform 504 includes a generally flat base sheet 508 and a frame 512 having two generally parallel side rails 512a and 512b and an end rail 512c. Disposed in the frame 512 to roll forward and backward on the base sheet 508 is a primary platform 516.

The primary platform 516 includes a pair of spaced apart cross rails 520 mounted on support bars 524, on the ends of which are wheels 528 which rest and roll over the base plate 508. The primary platform 516 moves under power of a pulley system in the direction indicated by the arrows 532.

A secondary platform 536 is disposed to roll laterally on the primary platform 516, along cross rails 520. The secondary platform 536 includes a generally square-shaped frame 540 on which are mounted wheels 544 to contact and roll over cross rails 520. The secondary platform 536 moves in the direction indicated by arrows 548.

Figure 9:
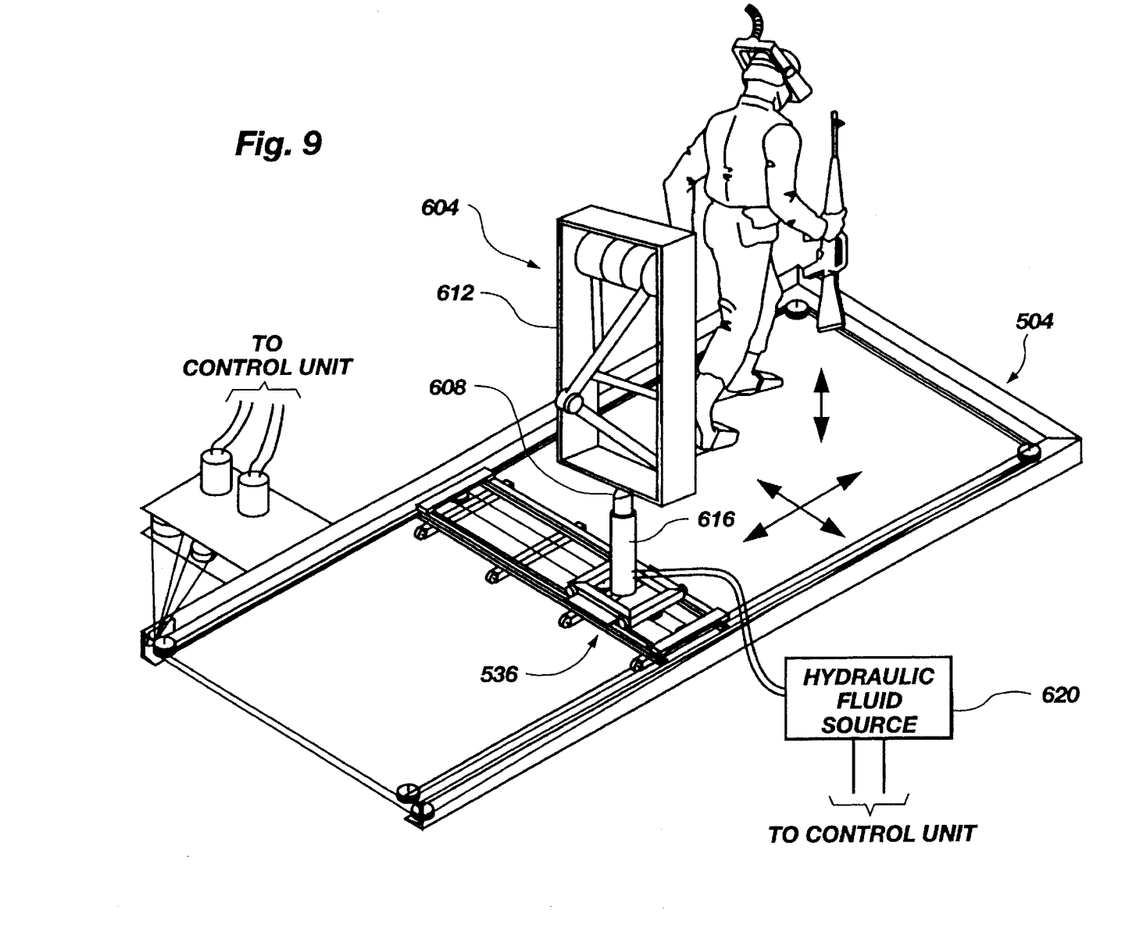
FIG. 9 is a perspective view of the translation platform of FIG. 8, with an individual person mobility simulator mounted thereon.

Both the primary platform 516 and secondary platform 536 are moved by pulley systems under control of motors 552 and 556 which, in turn, are controlled by a control unit 550. In particular, after an operator on an individual person mobility simulator, mounted on the secondary platform 536 (as seen in FIG. 9), walks or runs on the simulator, the platforms 516 and 536 would be moved together to effectuate moving of the operator in the direction of his walking or running to thereby simulate acceleration by the operator, but then the platforms would be moved back to the center region of the frame 512. The return movement of the platforms 516 and 536 would be sub-threshold to minimize the feelings of acceleration by the operator on the return "stroke".

The pulley system includes a drive pulley 560 and closed loop drive line 564 for driving the primary platform 516, and a drive pulley 568 and closed loop drive line 572 for driving the secondary platform 536. Drive pulley 560 is drivingly coupled to drive motor 552, and drive pulley 568 is drivingly coupled to drive motor 556. The pulley system connections could be arranged in several ways to effectuate movement of the platforms 516 and 536, including those shown in FIGS. 8A (for moving the primary platform 516) and 8B (for moving the secondary platform 536).

Figure 8A:
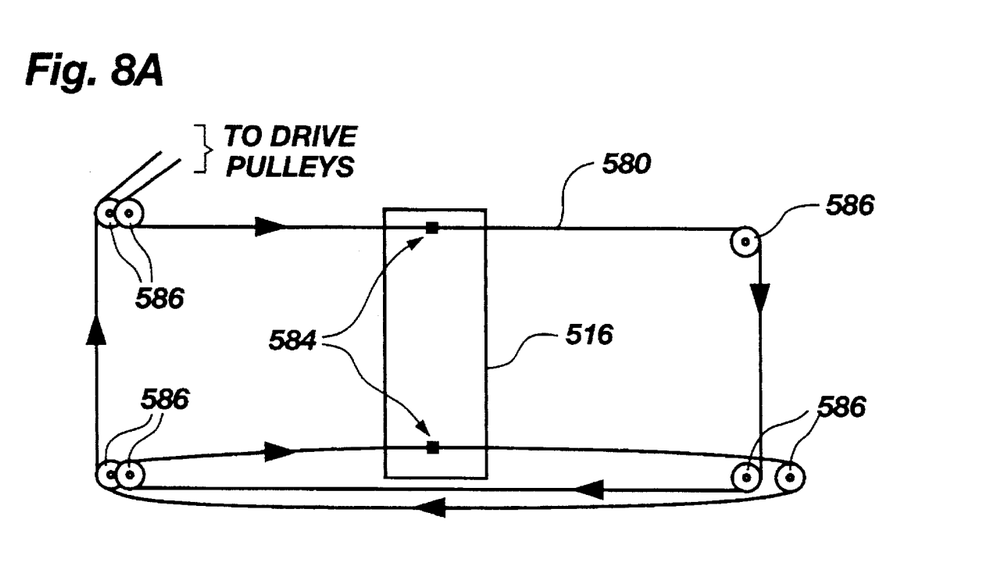
FIG. 8A is a top, schematic view of a pulley system for moving the primary platform of FIG. 8.
Figure 8B:
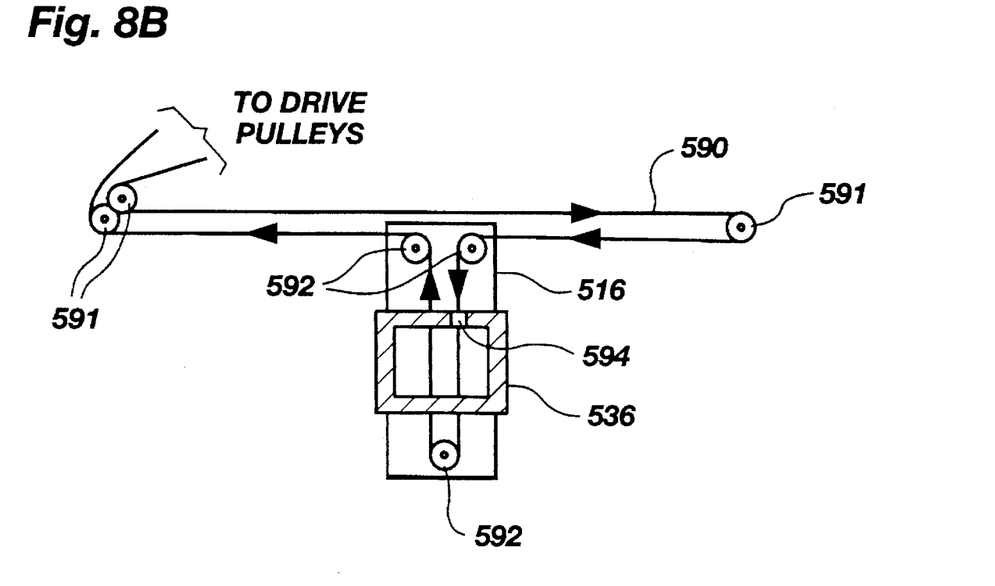
FIG. 8B is a top, schematic view of a pulley system for moving the secondary platform of FIG. 8.

In FIG. 8A, a pulley drive line 580 is wrapped about pulleys 586 and attached to the primary platform 516 by clamps 584 so that movement of the drive line causes the primary platform to move. Changing direction of movement of the pulley drive line 580, of course, changes direction of movement of the primary platform 516, all under control of the control unit 550 (FIG. 8). In FIG. 8B, a pulley drive line 590 is wrapped about pulleys 591 and pulleys 592 mounted on the primary platform 516, and attached to the secondary platform 536 by a clamp 594 so that movement of the drive line 590 causes the secondary platform to move laterally, relative the primary platform. Note that if the primary platform 516 is moved forwardly or rearwardly and it is desired that the secondary platform 536 not move relative to the primary platform, the drive line 590 must be moved relative to pulleys 591 at the same speed as that of movement of the primary platform, in order for the secondary platform to remain stationary on the primary platform. This would all be done under control of the control unit 550 (FIG. 8).

FIG. 9 is a perspective view of a translational platform 504 with a simulator similar to the type shown in FIG. 6 mounted on the secondary platform 536. In this embodiment, the simulator 604 includes a piston 608 extending downwardly from a frame 612 of the simulator and is slidably disposed in a cylinder 616 which is mounted on and extending upwardly from the secondary platform 536. The piston 608 and cylinder 616 comprise a hydraulic lift which operates under control of a hydraulic fluid source 620 which, in turn, operates under control of a control unit. The hydraulic fluid source 620 selectively supplies hydraulic fluid to the cylinder 616 to control the upward or downward movement of the piston 608 therein, to thereby provide for vertical movement of the simulator 604 and operator. In this manner, the translational platform 504 is able to provide three degrees of freedom of movement for the operator. The vertical movement or translation of the simulator could also be effectuated by electric motor.

In the manner described, a realistic simulated environment is provided for the training of military personnel where those personnel are removed from training fields and yet allowed to exercise movements and make decisions similar to what would be required in the field. This simulation may take place in laboratory-like surroundings to better ensure the safety of the personnel and to allow for more closely monitoring and evaluating of performance of the personnel.

Although the individual person mobility simulator was described for being especially adapted for combat simulation, the simulator could also be used for entertainment, athletic training and evaluation, and any physical activity where monitoring and/or evaluation are desired.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements.

What is claimed is:

1. An individual person mobility simulator comprising a base for placement on a support surface, platform means mounted on the base to rotate about a generally vertical axis, a steering post extending upwardly from the platform means, to terminate in an upper end, seat means mounted on the upper end of the steering post, on which a human operator may sit, means for detecting torque/displacement applied to the seat means generally about said vertical axis, and first power means responsive to the detecting means detecting torque/displacement for rotating the platform means relative to the base.

2. A simulator as in claim 1 wherein said detecting means includes means for detecting the direction of the torque/displacement applied to the seat means, and wherein said first power means comprises means responsive to the detecting means for rotating the platform means in the direction of the detected torque/displacement.

3. A simulator as in claim 2 wherein said steering post comprises a tubular shaft having an upper end and a lower end, wherein said seat means includes a seat post insertable into the upper end of the tubular shaft, and rotatable therein, and wherein the detecting means includes means for detecting displacement of the seat post relative to the tubular shaft.

4. A simulator as in claim 1 further comprising display means wearable on the head of the operator for developing, in response to display signals, scenes for viewing by the operator, and control means for supplying display signals to the display means.

5. A simulator as in claim 4 wherein said control means includes means for supplying display signals to the display means to change the scene displayed, in response to the detecting means detecting torque/displacement applied to the seat means.

6. A simulator as in claim 5 wherein said detecting means includes means for detecting the direction of the torque/displacement applied to the seat means, and wherein said control means includes means for supplying display signals to the display means to cause the scene displayed to move on the display means relative to the operator in a direction opposite the direction of the detected torque/displacement.

7. A simulator as in claim 4 further including means mountable on the operator for sensing rotation of the operator's head, wherein said control means includes means responsive to the sensing means sensing rotation of the operator's head for supplying display signals to the display means to change the scene displayed.

8. A simulator as in claim 7 wherein said sensing means incudes means for detecting the direction of rotation of the operator's head, and wherein said control means includes means for supplying display signals to the display means to cause the scene displayed to move, on the display means relative to the operator, in a direction opposite the direction of rotation of the operator's head.

9. A simulator as in claim 1 further comprising pedal means rotatably mounted on the steering post and including two pedals on which the operator's feet may be placed to pedal and rotate the pedal means, second power means coupled to the pedal means for supplying a resistive torque to the pedal means to provide a resistance to pedaling by the operator, in response to resistance signals, and control means for selectively supplying resistance signals to the second power means.

10. A simulator as in claim 9 further comprising display means for developing scenes viewable by the operator, in response to display signals, said scenes comprising changeable views of various ground terrain including uphill, level and downhill, produced in response to various respective display signals, and wherein said control means includes means for supplying display signals to the display means, and means for supplying resistance signals to the second power means to increase the resistance to pedaling when uphill terrain is displayed and decrease resistance when downhill terrain is displayed.

11. A simulator as in claim 10 wherein said display means comprises wearable goggle means for disposition on the operator's head, said goggle means including screen means disposed in front of the operator's eyes for producing scenes to enable the operator to directly view the scenes.

12. A simulator as in claim 10 wherein said display means comprises one or more screens at least partly surrounding the operator, and projector means for projecting the scenes on the screens for viewing by the operator.

13. A simulator as in claim 10 wherein said control means includes means for supplying display signals to the display means to change the scenes displayed in response to pedal signals, said simulator further comprising means for detecting rotation of the pedal means and for supplying pedal signals to the control means.

14. A simulator as in claim 13 wherein said pedal rotation detecting means includes means for detecting the direction of rotation of the pedal means, and wherein said control means includes means for supplying display signals to the display means to cause the scenes displayed to move on the display means relative to the operator, toward the operator if the pedal means is rotated forwardly, and away from the operator if the pedal means is rotated backwardly.

15. A simulator as in claim 13 that can provide data to and receive data from other simulators operated by other operators, wherein said simulator further comprises:
   means for producing data identifying the location of an icon representing an operator in the scenes,
   means for supplying such data to the control means of other simulators, and
   means for receiving such data from other simulators and supplying display signals to the display means causing the display means to display scenes showing icons of other operators.

16. A simulator as in claim 15 which further comprises a support brace projecting upwardly to a location above and in front of the seat means, against which the respective operator may lean for support.

17. A simulator as in claim 16 which further includes manually operable means located on the respective support brace for operation by the respective operator to signal the respective control means that the operator is in an upright position, crouch position, or prone position, and wherein each control means further includes means responsive to said manually operable means for reducing the size of the icon representing the respective operator from largest, when the upright position is indicated, to mid-size, when the crouch position is indicated, to smallest, when the prone position is indicated.

18. A simulator as in claim 1 further including a translation platform which comprises
   an elongate sheet means,
   a primary platform selectively moveable longitudinally on the sheet means, and
   a secondary platform selectively moveable on the primary platform in a direction laterally of the direction of movement of the primary platform, said base being mounted on the secondary platform to move with movement of the primary and/or secondary platform.

19. A simulator as in claim 18 further including third power means responsive to third control signals for selectively moving the primary platform means, fourth power means responsive to fourth control signals for selectively moving the secondary platform means, and control means for selectively supplying third control signals to the third power means and fourth control signals to the fourth power means.

20. A simulator as in claim 18 further including vertical lift means mounted on the secondary platform, and on which the base is mounted, for selectively moving the base generally vertically in response to lift control signals, and control means for selectively supplying lift control signals to the vertical lift means.

21. Apparatus for simulating mobility of a human operator comprising
   a base,
   a pair of foot supports movably mounted on the base for receiving and supporting the feet of an operator, said foot supports moving in response to movement of the operator's feet,
   resistive force means coupled to the foot supports for applying a resistive force to movement of the foot supports in response to condition signals,
   a movement sensing means for sensing movement of the operator and producing movement signals indicating the movement of the operator to the control means,
   display means responsive to display signals for developing scenes viewable by the operator, and
   control means for receiving the movement signal from the movement sensing means, supplying display signals to the display means to determine the scenes displayed, and for supplying condition signals to the force means to selectively vary the resistive forces applied to the foot supports.

22. Apparatus as in claim 21 wherein said display means includes means for developing scenes of various ground terrain including uphill, level and downhill, in response to various respective display signals, and wherein said control means includes a means for supplying condition signals to the force means to increase the resistive forces applied to the foot supports when uphill terrain is displayed and to decrease the resistive forces when downhill terrain is displayed.

23. Apparatus as in claim 21 further comprising means for sensing movement of the foot supports and for producing movement indication signals, and wherein said control means includes means responsive to the movement indication signals for supplying display signals to the display means to change the scenes being displayed.

24. Apparatus as in claim 23 wherein said display means includes
   a screen disposed at least in front of the operator when the feet of the operator are supported in the foot supports, and
   projector means responsive to display signals from the control means for projecting the scenes on the screen for viewing by the operator.

25. Apparatus as in claim 23 wherein said display means comprises head gear means for disposition on the head of the operator over the operator's eyes for display of the scenes for viewing by the operator.

26. Apparatus as in claim 25 further comprising means disposable on the operator for detecting rotation of the operator's head and for producing head rotation signals, and wherein said control means includes means for supplying display signals to the head gear means to change the scenes displayed in response to the head rotation signals.

27. Apparatus as in claim 26 wherein said head rotation detecting means includes means for detecting the direction of rotation of the operator's head, and wherein said control means includes means for supplying display signals to the head gear means to cause the scenes displayed to move in a direction opposite the direction of rotation of the operator's head so that it appears to the operator that the scenes remain static as the head rotates.

28. Apparatus as in claim 21 further comprising a support on which the base is rotatably mounted, seat means extending up from the base, on which the operator may sit, means for detecting torque applied by the operator to the seat means when twisting on the seat means, and means responsive to the detected torque for rotating the base and seat means relative to the support.

29. Apparatus as in claim 21 wherein said base comprises a base support having a rear, and a frame upstanding from the rear of the base support, and wherein each of said foot supports includes an articulated arm means mounted at a proximal end to the frame to project forwardly generally above the base support and terminate in a distal end, said distal end moveable at least forwardly and rearwardly, and upwardly and downwardly, and foot holder means mounted on the distal end of the articulated arm for receiving and holding a foot of the operator.

30. Apparatus as in claim 29 wherein each articulated arm includes a lower arm joined at one end to a respective foot holder means, and an upper section comprising first and second generally parallel legs pivotally joined at lower ends to the other end of the lower arm at spaced-apart forward and rearward locations respectively, and a linkage arm pivotally joined at one end to the upper end of the second to project forwardly toward the upper end of the first leg.

31. Apparatus as in claim 30 wherein said resistive force means includes first power means coupled to the upper end of the first leg for supplying a resistive force to pivoting of the first leg in a certain plane in response to first resistance signals, and second power means coupled to the other end of the linkage arm for supplying a resistive force to pivoting of the linkage in said certain plane in response to second resistance signals, and wherein said control means includes means for selectively supplying first resistance signals to the first power means and second resistance signals to the second power means.

32. Apparatus as in claim 31 wherein said resistive force means further includes third power means coupled to the first and second power means for supplying a resistive force to rotation of the first and second power means about a generally vertical axis in response to third resistance signals, and wherein said control means further includes means for selectively supplying third resistance signals to the third power means.

33. Apparatus as in claim 21 further including an acceleration platform comprising a base support for placement on a support surface, first platform means selectively moveable in a first direction on the base support, and second platform means selectively moveable on the first platform means in a direction at right angles to the first direction, said base being mounted on the second platform means to move with movement of the first and second platform means.

34. Apparatus as in claim 33 further including first power means responsive to first control signals for selectively moving the first platform means, and second power means responsive to second control signals for selectively moving the second platform means, and wherein said control means includes means for selectively supplying first control signals to the first power means and second control signals to the second power means.

35. Apparatus as in claim 34 further including third power means mounted on the second platform means and on which the base is mounted, for selectively moving the base and foot supports generally vertically in response to third control signals, and wherein said control means further includes means for selectively supplying third control signals to the third power means.

36. An assembly comprising a plurality of individual person mobility simulators, each of said simulators for accommodating a different operator, each of said simulators comprising;

a base for placement on a support surface;

platform means mounted on the base to rotate about a generally vertical axis;

a steering post extending upwardly from the platform means, to terminate in an upper end;

seat means mounted on the upper end of the steering post, on which a human operator may sit;

means for detecting torque/displacement applied to the seat means generally about said vertical axis;

first power means responsive to the detecting means detecting torque/displacement for rotating the platform means relative to the base;

pedal means rotatably mounted on the steering post and including two pedals on which the operator's feet may be placed to pedal and rotate the pedal means;

second power means coupled to the pedal means for supplying a resistive torque to the pedal means to provide a resistance to pedalling by the operator, in response to the resistance signals;

control means for selectively supplying resistance signals to the second power means;

display means for developing scenes viewable by the operator, in response to display signals, said scenes comprising changeable views of various ground terrain including uphill, level and downhill, produced in response to various respective display signals, and wherein said control means includes means for supplying display signals to the display means, means for supplying resistance signals to the second power means to increase the resistance to pedaling when uphill terrain is displayed and decrease resistance when downhill terrain is displayed, and means for supplying display signals to the display means to change the scenes displayed in response to pedal signals;

means for detecting rotation of the pedal means and for supplying pedal signals to the control means;

wherein each control means of each of said simulators further includes means for producing data identifying the location of an icon representing the respective operator in the scenes, relative to the other operators;

means for supplying such data to the control means to the other simulators; and means responsive to such data for supplying display signals to the respective display means for causing the respective display means to display scenes showing icons of the other operators.

37. An assembly as in claim 36 wherein each of said simulators further comprises a support brace projecting upwardly to a location above and in front of the seat means, against which the respective operator may lean for support.

38. An assembly as in claim 36 wherein each of said simulators further includes manually operable means located on the respective support brace for operation by the respective operator to signal the respective control means that the operator is in an upright position, crouch position, or prone position, and wherein each control means further includes means responsive to said manually operable means for reducing the size of the icon representing the respective operator from largest, when the upright position is indicated, to mid-size, when the crouch position is indicated, to smallest, when the prone position is indicated.

* * * * *